US007512374B2

(12) United States Patent
Ono et al.

(10) Patent No.: US 7,512,374 B2

(45) Date of Patent: Mar. 31, 2009

(54) DOCUMENT CARRYING DEVICE, DOCUMENT READING DEVICE, AND IMAGE FORMING DEVICE

(75) Inventors: Yasuhiro Ono, Kyoto (JP); Makoto Masuda, Nara (JP); Sohichi Takata, Nara (JP); Hisashi Yamanaka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 440 days.

(21) Appl. No.: 10/565,365

(22) PCT Filed: Jul. 15, 2004

(86) PCT No.: PCT/JP2004/010114

§ 371 (c)(1),
(2), (4) Date: Jan. 23, 2006

(87) PCT Pub. No.: WO2005/019075

PCT Pub. Date: Mar. 3, 2005

(65) Prior Publication Data

US 2006/0291929 A1 Dec. 28, 2006

(30) Foreign Application Priority Data

Jul. 24, 2003 (JP) ............................ 2003-279383

(51) Int. Cl.

*G03G 15/00* (2006.01)
*H04N 1/00* (2006.01)
*B65H 5/00* (2006.01)

(52) U.S. Cl. ....................... 399/367; 399/365; 358/498; 271/8.1

(58) Field of Classification Search .................. 399/16, 399/17, 21, 361, 363, 365, 367–380; 358/498; 271/8.1–171; *G03G 15/00, 21/00*
See application file for complete search history.

(56) References Cited

U.S. PATENT DOCUMENTS

| | | | | |
|---|---|---|---|---|
| 6,145,834 | A * | 11/2000 | Hirota et al. | 271/225 |
| 6,470,532 | B2 * | 10/2002 | Rude | 16/335 |

FOREIGN PATENT DOCUMENTS

| | | | |
|---|---|---|---|
| JP | 05155463 | A * | 6/1993 |
| JP | 8-297382 | A | 11/1996 |
| JP | 8-334936 | A | 12/1996 |
| JP | 10153889 | A * | 6/1998 |
| JP | 11-5659 | A | 1/1999 |
| JP | 11005659 | A * | 1/1999 |
| JP | 2002189319 | A * | 7/2002 |
| JP | 2002-278174 | A | 9/2002 |
| JP | 2002278174 | A * | 9/2002 |

* cited by examiner

*Primary Examiner*—Jill E Culler
*Assistant Examiner*—'Wyn' Q Ha
(74) *Attorney, Agent, or Firm*—Birch, Stewart, Kolasch & Birch, LLP

(57) ABSTRACT

A document transporting device (30) serves as a platen cover to expose and cover platens (21A,21B). A document holder (5) is mounted on a predetermined mounting portion of the device (30). A lateral end of the document holder (5) is withdrawn from a predetermined position where the end is located, so that a document transport path (R) is exposed through an area in which the document holder (5) has been withdrawn. The document transport path (R) is exposed to the left or the right with respect to the front of the device (30).

8 Claims, 12 Drawing Sheets

DOCUMENT CARRYING DEVICE, DOCUMENT READING DEVICE, AND IMAGE FORMING DEVICE

TECHNICAL FIELD

The invention relates to document transporting devices that automatically feed an original document to document reading area on a platen. The invention further relates to document reading devices and image forming apparatuses provided with such document transporting devices.

BACKGROUND ART

Document transporting devices are devices for transporting a plurality of document sheets from a document tray where the sheets are stacked, to a document reading area where the sheets are sequentially read. Such document transporting devices are widely used in document reading devices and image forming apparatuses. Document sheets are transported from the document tray to the document reading area through a document transport path that is formed so as to lead from the document tray to a platen. In the event of a document sheet being jammed in the document transport path, the jammed sheet is conventionally removed either by opening a top cover of the apparatus, which serves as an upper portion of the path, in order to expose the path, or by pulling a leading end of the sheet as held by registration rollers.

A shape of the path disposed in a document cover may sometimes cause difficulty in removing a sheet jammed in the path. Some recent document transporting devices have a transversely U-shaped document transport path. The shape allows the path to have an appropriate length for transporting a document sheet and, at the same time, to feed a document sheet to a platen in a position as horizontal as possible. The shape also contributes to downsizing of document transporting devices. As can be expected from the shape, the path has a two-tier construction and is divided into an upper portion, a curved portion, and a lower portion. Thus, there is difficulty in removing a document sheet jammed in the lower portion, even when a top cover of the document transporting device is opened.

To deal with the foregoing problem, there has been proposed automatic document feeding devices in which a document holder, which holds an original document as placed on the document platen so that the document will not move, is adapted to pivot around a pivot axis that is disposed parallel to a document transport direction, in order to expose a portion of a document transport path positioned immediately above the document holder (see Patent Literature 1).

Patent Literature 1: JP H11-5659 A

DISCLOSURE OF THE INVENTION

Problem to be Solved by the Invention

However, the automatic document feeding device of Patent Literature 1 has a problem that the document holder needs to be pivoted at a wide angle for proper removal of an original document jammed in the document transport path. A small pivot angle of the document holder makes it hard to reach an original document jammed at a rear side of the document reading device, thereby preventing proper removal of the jammed document.

A feature of the invention is to provide a document transporting device that allows a sheet jammed in a document transport path to be properly removed by a small movement of a document holder, and a document reading device and an image forming apparatus provided with the document transporting device.

Solution

To offer the above-mentioned feature, a document transporting device according to the invention includes an exposing mechanism adapted to expose a document transport path by withdrawing a lateral end of a document holder mounted on a platen cover from a predetermined position and by moving a movable plate that is sandwiched between the predetermined position and the document transport path. The lateral end of the document holder normally corresponds to a longitudinal end thereof. According to the invention, in order to withdraw the lateral end of the document holder from the predetermined position, the document holder is adapted such that the document holder is likely to bend, or such that the document holder is partially or wholly slidable along the platen cover.

Advantage of the Invention

The invention allows the document transport path to be exposed on a surface of the platen cover that faces a platen, thereby facilitating removal of an original document jammed in the document transport path. The invention allows a jammed original document to be removed by a small movement of the document holder, even in a case in which the document transport path is a transversely U-shaped path divided into upper, curved, and lower portions, and the document is jammed in the lower portion.

DESCRIPTION OF THE REFERENCE NUMERALS

1—document reading section
2—image forming section
3—document guide

5—document holder
10—optical scanning unit
30—document transporting device
31—document tray
32—output tray
100—copying machine

THE BEST MODE FOR CARRYING OUT THE INVENTION

Referring to the accompanying drawings, described below is a copying machine 100 as an embodiment of the document transporting device, the document reading device, and the image forming apparatus, of the invention.

Figure 1:
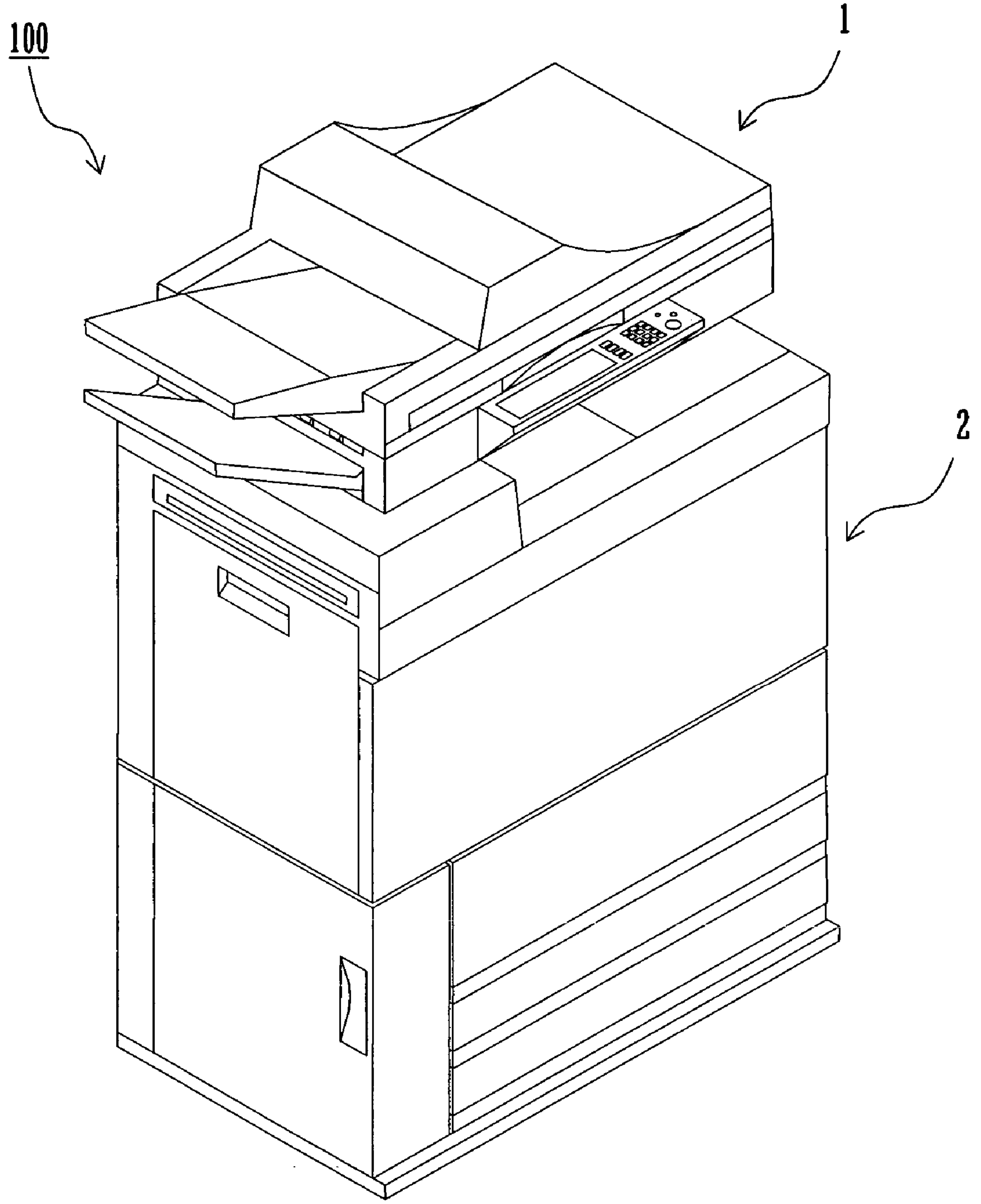
FIG. 1 is a view of a copying machine according to the invention.

As shown in FIG. 1, the copying machine 100 according to a first embodiment of the invention includes a document reading section 1 and an image forming section 2. The document reading section 1 is configured to read image data from an original document. The image forming section 2 is configured to perform an image forming process based on the image data as read by the document reading section 1.

Figure 2:
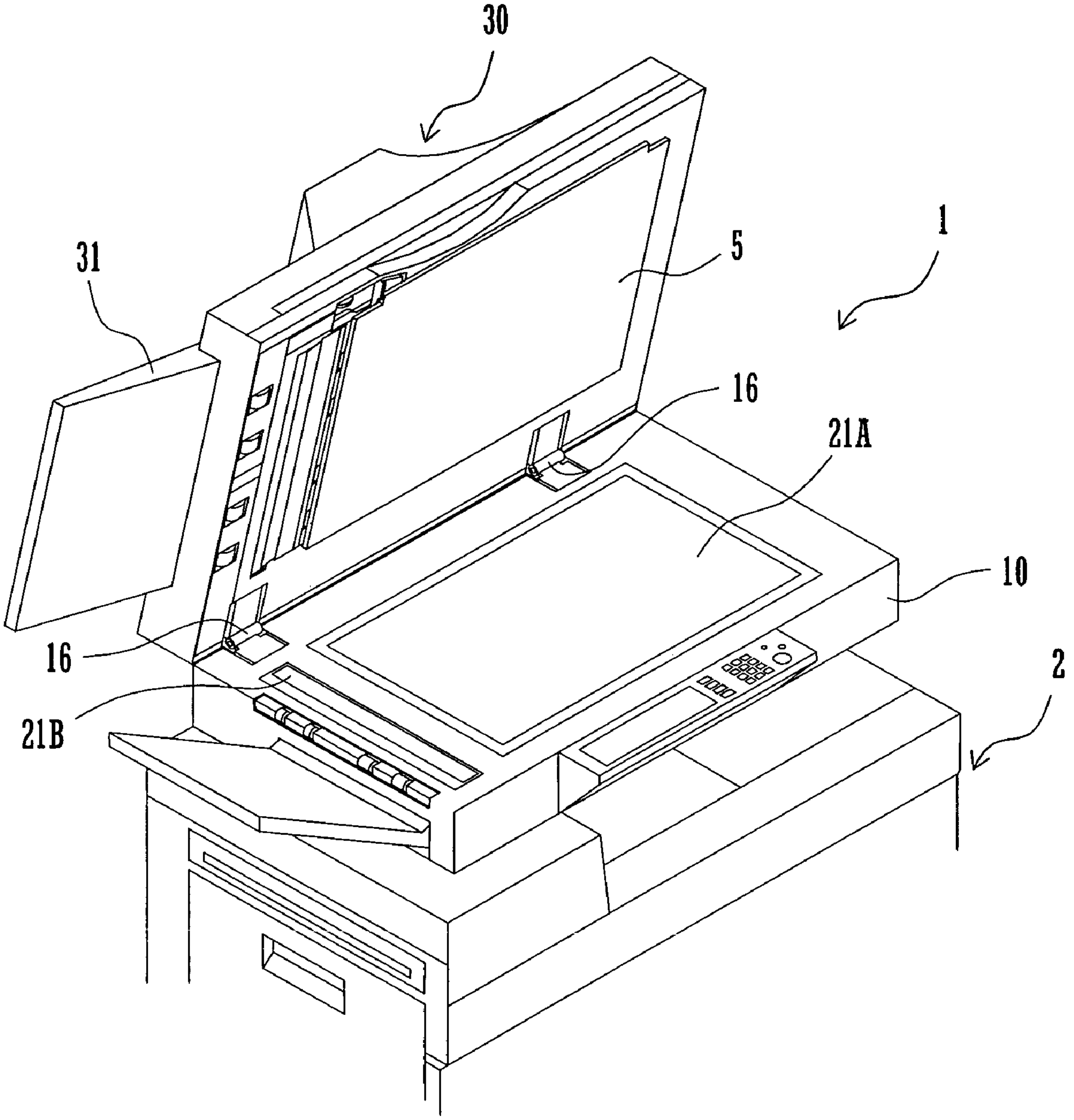
FIG. 2 is a view of a document reading device of the invention.

As shown in FIG. 2, the document reading section 1 has platens 21A and 21B, an optical scanning unit 10, and a document transporting device 30. The platens 21A and 21B, which are made of glass, are provided for original documents to be placed thereon. The optical scanning unit 10 is configured to read an image of an original document placed on the platen 21A or 21B. The document transporting device 30 has a document tray 31 and is configured sequentially to transport original documents stacked on the document tray 31 to the platen 21B. In the first embodiment, the document reading section 1 corresponds to the document reading device of the invention, and the copying machine 100 as the image forming apparatus of the invention.

Figure 3:
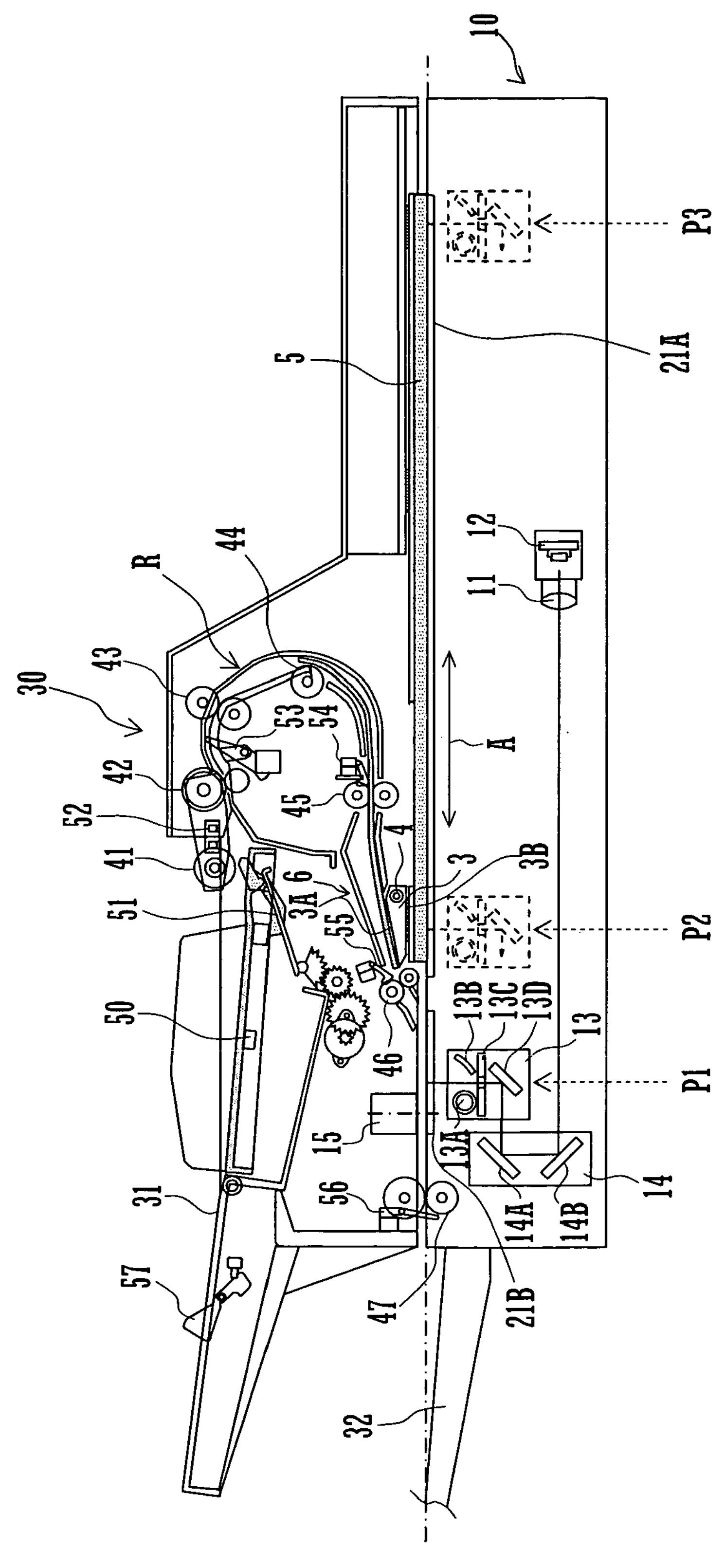
FIG. 3 is a cross-sectional view of the document reading device.

As shown in FIG. 3, the optical scanning unit 10 is positioned below the platens 21A and 21B. The optical scanning unit 10 has a light source unit 13, a mirror unit 14, an imaging lens 11, and a charge coupled device (hereinafter referred to merely as CCD) 12. The light source unit 13 has a light source 13A, a reflector 13B, a slit 13C, and a mirror 13D. The light source 13A irradiates an illuminating light with which to read an original document. The reflector 13B, which has a concavely curved reflection surface, focuses the illuminating light on a predetermined reading area on the platen 21. The slit 13C allows only light reflected from an original document to pass therethrough. The mirror 13D has a reflection surface inclined at an angle of 45 degrees to the plane of the platen 21 so as to refract a path of light that has passed through the slit 13C by 90 degrees.

The mirror unit 14 has a pair of mirrors 14A and 14B. The mirrors 14A and 14B are arranged with respective reflection surfaces thereof perpendicular to each other for guiding light reflected by the mirror 13D to the CCD 12.

The light source unit 13 and the mirror unit 14 are provided reciprocatably along a direction of arrow A that is parallel to the platens 21A and 21B. In FIG. 3, the light source unit 13 is stopped: at a position P1 for reading an original document being moved; and at a position P2 for reading a stationary original document. In reading an A3-size original document, the light source unit 13 is moved to a position P3 and back. In order to maintain a constant light path from an original document to the CCD 12, the mirror unit 14 is moved at a speed half as fast as that of the light source unit 13. The light source unit 13 and the mirror unit 14 are moved by stepping motors or servomotors.

The imaging lens 11 focuses reflected light from an original document on the CCD 12. The CCD 12 creates an electrical signal based on the reflected light. In the present embodiment, the imaging lens 11 and the CCD 12 collectively form a CCD reading unit.

An electrical signal created by the CCD 12 is transmitted as image data to the image forming section 2. According to image data as transmitted, the image forming section 2 performs an electrophotographic image forming process, which is known in the art, to produce a duplicate of the original document as read.

Referring back to FIG. 2, the document transporting device 30, which is located on the platens 21A and 21B, also serves as a platen cover to selectively expose and cover the platens 21A and 21B. The document transporting device 30 is hinged with a pair of hinges 16 to a board in which the platens 21A and 21B are provided.

The document transporting device 30 is pivoted downward around the hinges 16 so as to face the platens 21A and 21B when the platens 21A and 21B are to be covered. The device 30 is pivoted upward when the platens 21A and 21B are to be exposed. Normally, sheets of original documents to be read are transported to the platens 21A and 21B, with the platens 21A and 21B covered. There are types of original documents that the device 30 cannot automatically transport, such as books or bounded documents. Such original documents are directly placed on the platens 21A and 21B, with the device 30 pivoted upward and the platens 21A and 21B thus exposed.

When an original document is read in the device 30, a bottom surface of the document transporting device 30 faces the platens 21A and 21B. On the bottom surface mounted is a document holder 5 including an elastic material. In the present embodiment, the bottom surface corresponds to "a surface of the platen cover facing the platen" of the invention. A mounting structure for the document holder 5 is a feature of the invention, and will be described later in detail.

Inside the document transporting device 30, a document transport path R is formed, as shown in FIG. 3, so as to lead from the document tray 31, through the document reading area, to an output tray 32. The path R has a two-tier construction and is divided into an upper portion, a curved portion, and a lower portion. When viewed from a lateral perspective, the path R is transversely U-shaped, i.e., has a shape of letter U as tilted to the left at an angle of 90 degrees. Along the path R, a pick-up roller 41, a separating/transporting roller 42, transporting rollers 43 to 45, and registration rollers 46 are arranged in the mentioned order, from upstream to downstream along a direction in which an original document is transported. The roller 41 picks up a top sheet of original document stored in the document tray 31. The roller 42 is provided for separating multiple sheets and preventing the sheets to be transported concurrently in the event that the roller 41 pick up the multiple sheets. The rollers 43 to 45 are provided for transporting a sheet that has passed beyond the roller 42, further downstream along the path R. The rollers 46 are adapted to adjust a timing of feeding an original document to the document reading area. In addition, a plurality of detectors for detecting an original document are arranged along the path R, as described below.

In the document tray 31, a document detector 51, a first size detection sensor 50, and a second size detection sensor 57 are provided. The detector 51 is configured to determine whether an original document is present or absent in the tray 31. The sensors 50 and 57 are configured to determine what size an original document is. Furthermore, a pick-up roller position detector 52 and sheet detectors 53 to 55 are provided in the mentioned order, from upstream to downstream along the document transport path R. The detector 52 are configured to detect a vertical position of the roller 41. The detectors 53 to 55 are configured to detect an original document as fed.

A contact image sensor (hereinafter referred to as CIS) 15 is positioned so as to face the platen 21B as covered by the document transporting device 30. The CIS 15 has an array of image sensors, optical guiding means (a lens array such as a SELFOC lens array: SELFOC is a registered trademark of Nippon Sheet Glass, Co., Ltd.), and a light source (e.g., an LED array light source or a fluorescent light).

The detectors 53 to 55 are configured to detect whether a sheet of original document is being properly transported downstream on the document transport path R by the transporting rollers 43 to 45. The curved portion of the path R has such a curvature as to allow stable and smooth transportation of any type of original document sheet, even the thickest, and thus firmest, sheet readable.

Downstream of the curved portion along the path R, a registration area 6 is formed so as to be inclined at a small angle with respect to the platens 21A to 21B.

The registration area 6 is located between the transporting roller 45 and the registration rollers 46. In the registration area 6, a leading edge of original document sheet is properly positioned, and the sheet is deskewed. The area 6 has such a configuration as to allow an original document sheet to be transported in an approximately flat position between the transporting roller 45 and the registration rollers 46, so that there is low friction between the area 6 and a guiding surface of the path R. Note that it is only necessary to position the rollers 45 and 46 so that there is a distance therebetween longer than length of the smallest sheet that the document transporting device 30 can handle as measured in a direction in which the sheet is transported.

A document guide 3 is arranged in proximity to the registration area 6. The document guide 3 corresponds to the movable plate of the invention. The guide 3 is a plate with a pentagon-shaped cross section. The guide 3 has a first flat surface 3A and a second flat surface 3B. The surface 3A forms at least part of the document transport path R. To the surface 3B, part of the document holder 5 is fixed. In the first embodiment, as described above, the document guide 3 is a plate with a polygonal cross section. However, the guide 3 may have a different shape as long as the guide 3 has the first flat surface 3A and the second flat 3B.

The guide 3 is provided pivotably around a pivot shaft 4 that is oriented perpendicular to a document transport direction. The guide 3 is pivotable from a covering position to an exposing position and vice versa. When the guide 3 is in the covering position with the surface 3A forming part of the path R, the document transport path R is covered. With the guide 3 in the exposing position, the path R is exposed outward. In the present embodiment, the surface 3A, the pivot shaft 4, and the surface 3B correctively correspond to the exposing mechanism of the invention. The surface 3A is disposed on a side of the document holder 5 of the path R. The pivot shaft 4 serves as a pivot center for the document guide 3, as described earlier. The surface 3B is adapted to press part of the document holder 5 in a direction away from the path R when the guide 3 is pivoted around the pivot shaft 4.

Figure 4:
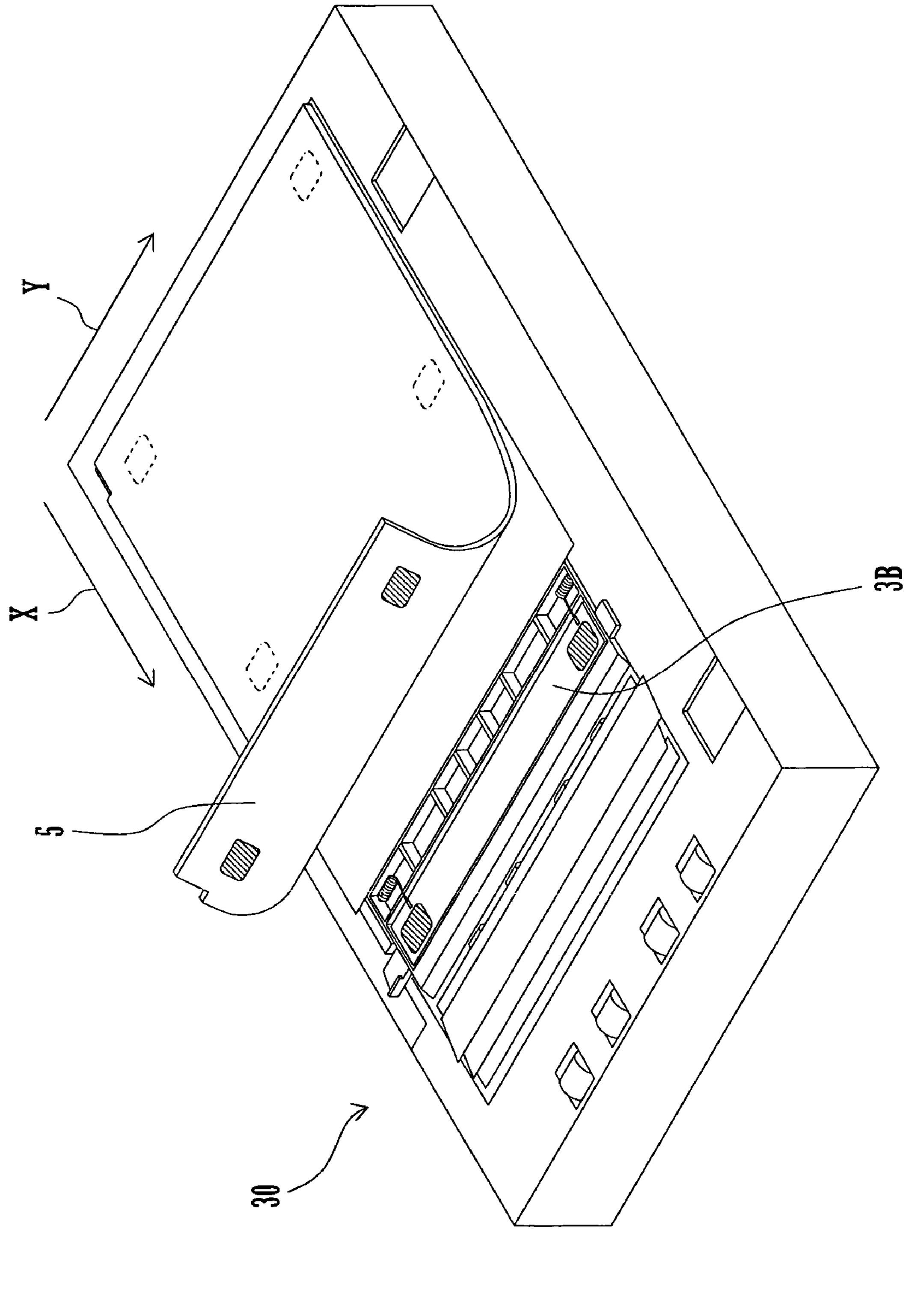
FIG. 4 is a view of a bottom surface of a document transporting device.

As shown in FIG. 4, the document holder 5 is mounted on a predetermined mounting portion of the bottom surface of the document transporting device 30. The mounting portion is assigned to a predetermined portion of the bottom surface so as to cover the maximum document size that the document reading section 1 can read. It is to be noted that the document transport direction is a direction in which an original document sheet is transported on a plane parallel to the platens 21A and 21B. In FIG. 4, the document transport direction is a direction indicated by an arrow X. Also, the direction perpendicular to the document transport direction is a direction indicated by an arrow Y.

Figure 5:
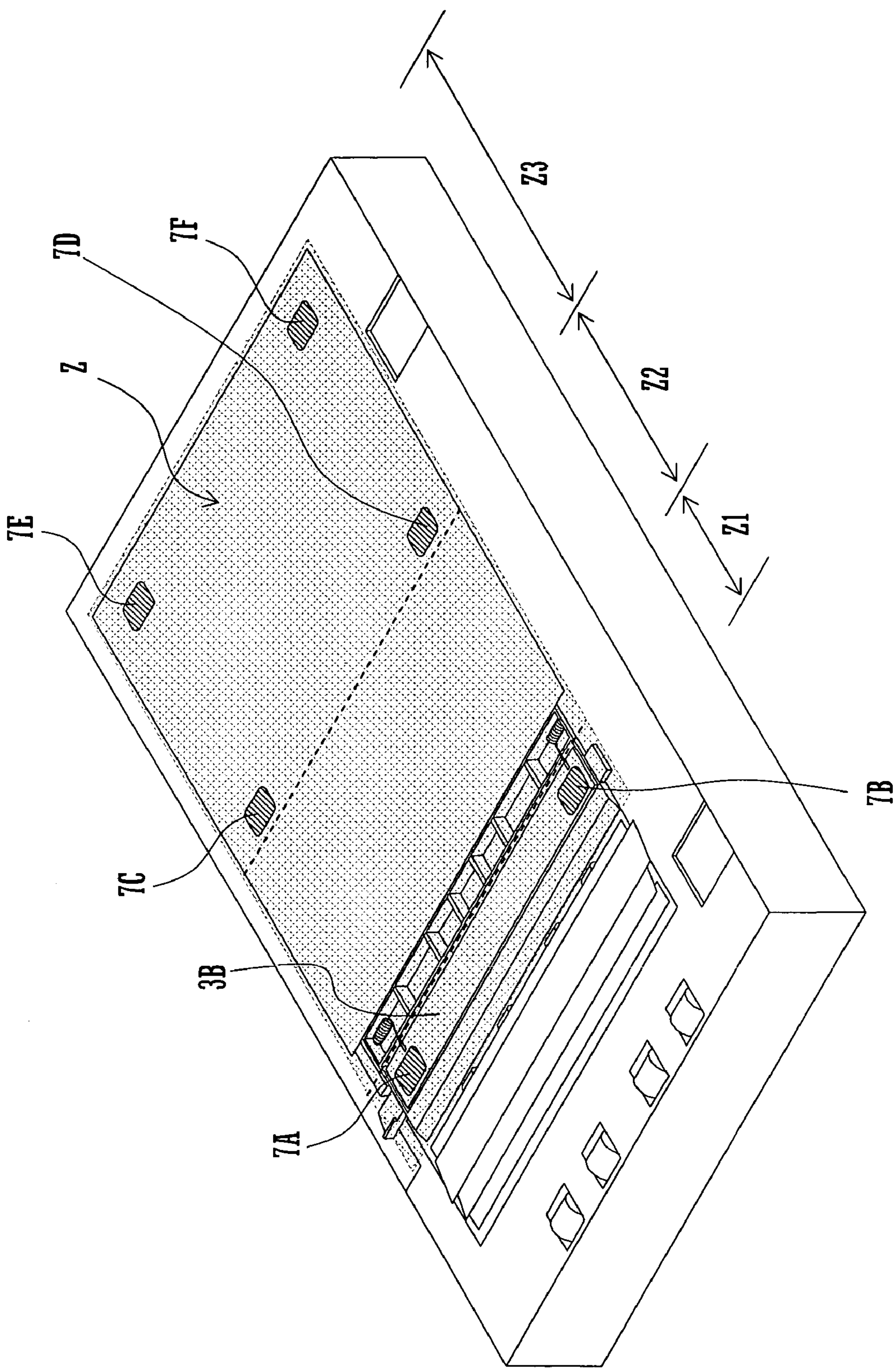
FIG. 5 is a view of the bottom surface of the document transporting device with a document holder removed.

FIG. 5 is a view of the bottom surface of the document transporting device 30 with the document holder 5 removed. The mounting portion, which is indicated by Z, is hatched in FIG. 5. As shown in FIG. 5, the mounting portion Z is divided into an exposed area Z1, an unfixed area Z2, and a fixed area Z3. In the present embodiment, the areas Z1, Z2, and Z3 are arranged in the mentioned order along a longitudinal direction of the bottom surface of the document transporting device 30.

The exposed area Z1 is an area where a portion of the document holder 5 to be withdrawn is located, i.e., an area through which part of the document transport path R is to be exposed in the event of a sheet jam. The unfixed area Z2, which is sandwiched between the exposed area Z1 and the fixed area Z3, is an area where the document holder 5 is not fixed. The fixed area Z3 is an area where the document holder 5 is fixed. The document holder 5 is fixed to the mounting portion Z with six hook-and-loop fasteners 7A to 7F. The fasteners 7A and 7B are attached to the exposed area Z1, and the fasteners 7C to 7F to the fixed area Z3.

As described above, the document holder 5 is fixed to the bottom surface at six points with the six fasteners 7A to 7F. This is because the document holder 5 bends excessively and gets a deep crease therein when part of the holder 5 is withdrawn from the exposed area Z1 if the document holder 5 is fixed at four corners to the bottom surface. In the present embodiment, each of the fasteners 7A to 7F has a size of 20 mm by 25 mm. However, the fasteners 7A to 7F may be arbitrarily sized.

Figure 6:
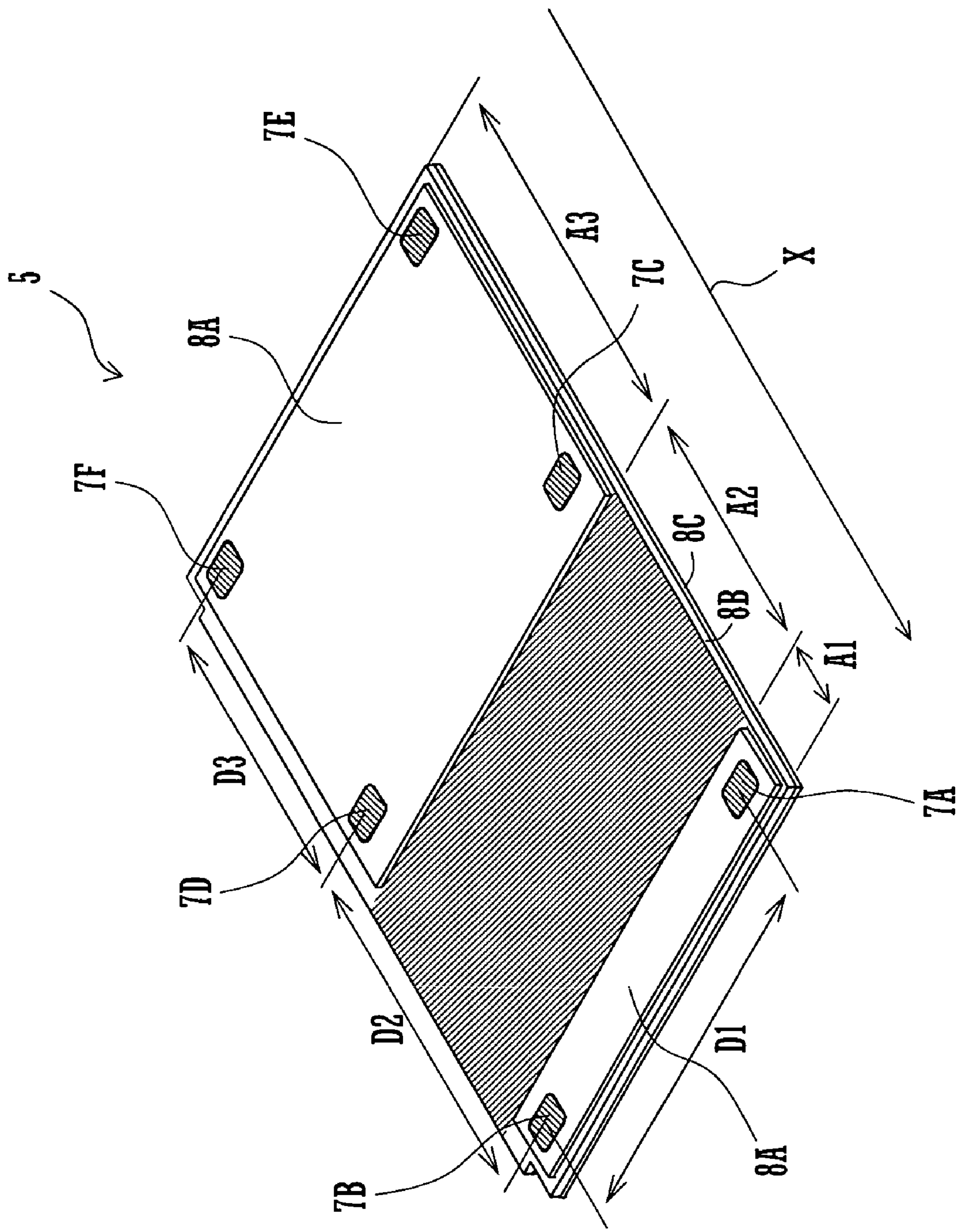
FIG. 6 is a view of the document holder.

FIG. 6 is a view of a surface of the document holder 5 that is to face the bottom surface of the document transporting device 30 when the holder 5 is mounted on the bottom surface. The document holder 5 needs only to have such a size as to cover the maximum size document that the image reading section 1 can read. In the present embodiment, the document holder 5 has a size of 310 mm by 440 mm so as to cover the document sizes of A3 (297 mm by 420 mm) and Ledger (11 inch by 17 inch).

The document holder 5 is divided into an exposed portion A1, an unfixed portion A2, and a fixed portion A3. The portions A1 to A3 are arranged in the mentioned order along the longitudinal direction of the bottom surface of the device 30. The portions A1, A2, and A3 are to face the areas Z1, Z2, and Z3, respectively, when the holder 5 is mounted on the bottom surface. In the present embodiment, the portions A1, A2, and A3 are 60 mm, 150 mm, and 230 mm long, respectively, as measured in the document transport direction. In addition, there are a distance D2 of 200 mm between respective centers of the fasteners 7A and 7C, a distance D3 of 150 mm between respective centers of the fasteners 7C and 7E, and a distance D1 of 250 mm between respective centers of the fasteners 7A and 7B.

The document holder 5 is thin enough to bend easily when acted upon by an external force. The document holder 5 has a multi-layer construction, including a white sheet 8C to have contact with an original document, a cushion mat 8B made of a foam material such as urethane, and a mylar sheet 8A as a backing.

In the first embodiment, the white sheet 8C is made of PET (polyethylene terephthalate) and has a thickness of approximately 0.125 mm. As the cushion mat 8B, a sponge-like mat with a thickness of approximately 5 mm is used so as to be able to apply uniform pressure on an entire original document.

The mylar sheet 8A has a thickness of 0.125 mm. The mylar sheet 8A has a flat smooth surface that is to face the bottom surface of the document transporting device 30 when the document holder 5 is mounted on the bottom surface. The mylar sheet 8A is provided to serve as an intervening member between the cushion mat 8B and the fasteners 7A to 7F. It is because when directly attached to the cushion mat 8B the fasteners 7A to 7F is likely to come detached. It is also because the cushion mat 8B is likely to be partly torn off when the fasteners 7A to 7F come detached. The mylar sheet 8A as used herein is larger in size than the fasteners 7A to 7F, so that the document holder 5 is fixed to the device 30 while the fasteners 7A to 7F are prevented from coming detached, or the cushion mat 8B from being partly torn off, by a force generated when the document holder 5 is bended.

It is to be noted that the mylar sheet 8A is provided only on the exposed portion A1 and the fixed portion A3, not on the unfixed portion A2. It is because that if the unfixed portion A2 consists of the three layers of the white sheet 8C, the cushion mat 8B, and the mylar sheet 8A, the unfixed portion A2 will be less likely to be bended. Since the mylar sheet 8A is not provided on the unfixed portion A2 that is to be purposely bended, the document holder 5 is allowed to be bended smoothly, as described later, when the document holder 5 is withdrawn from the exposed area Z1.

Described below is a method in which the document holder 5 is mounted on the bottom surface of the document transporting device 30 in factory assembly. First, the device 30 is pivoted upward to expose the platens 21A and 21B. Then, the document holder 5 is placed at an appropriate position on the platens 21A and 21B. Next, one side of each of the loop-and-hook fasteners 7A to 7F with hook and loop sides fastened together is adhered with two-sided adhesive tape to a depressed portion 24 of the bottom surface of the device 30. To the other side of each of the fasteners 7A to 7F, further, a first adhesive face of two-sided adhesive tape is put. With a second adhesive face of the tape exposed toward the document holder 5, the device 30 is pivoted downward to cover the platens 21A and 21B. Thus, the document holder 5 is mounted on a predetermined mounting portion of the bottom surface of the device 30.

Figure 7:
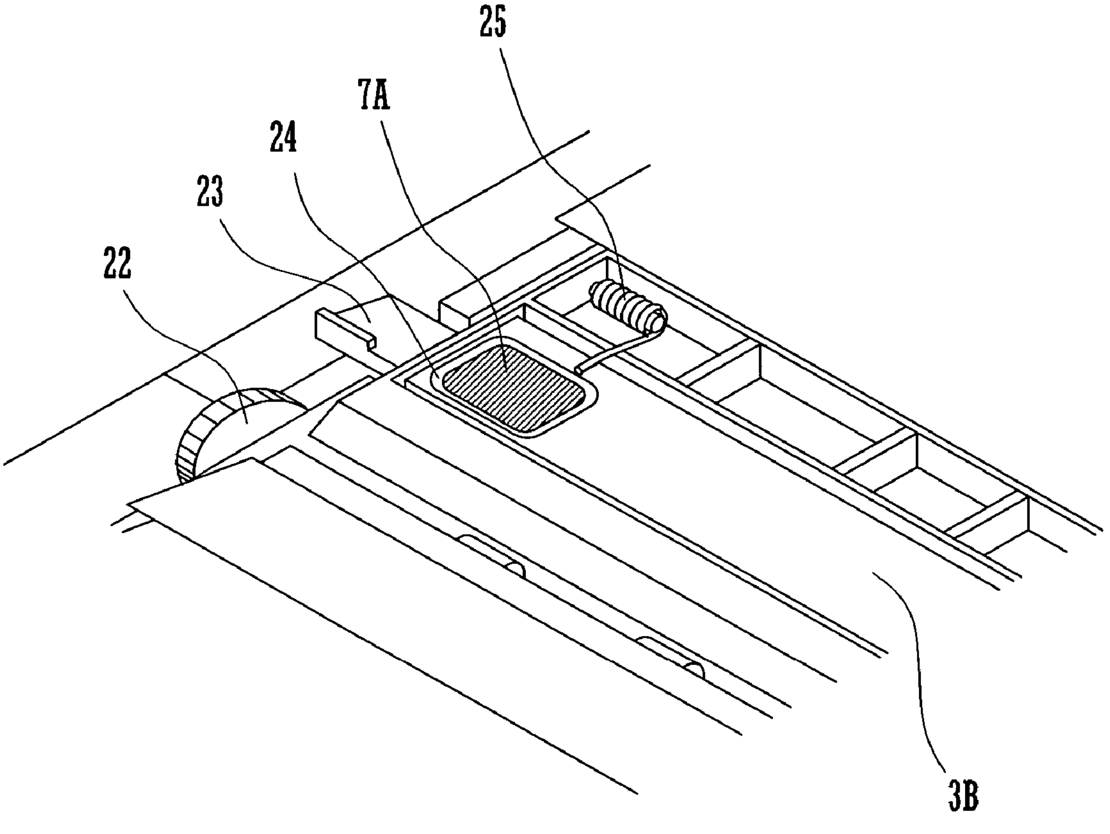
FIG. 7 is a partial view of the document transporting device.
Figure 8:
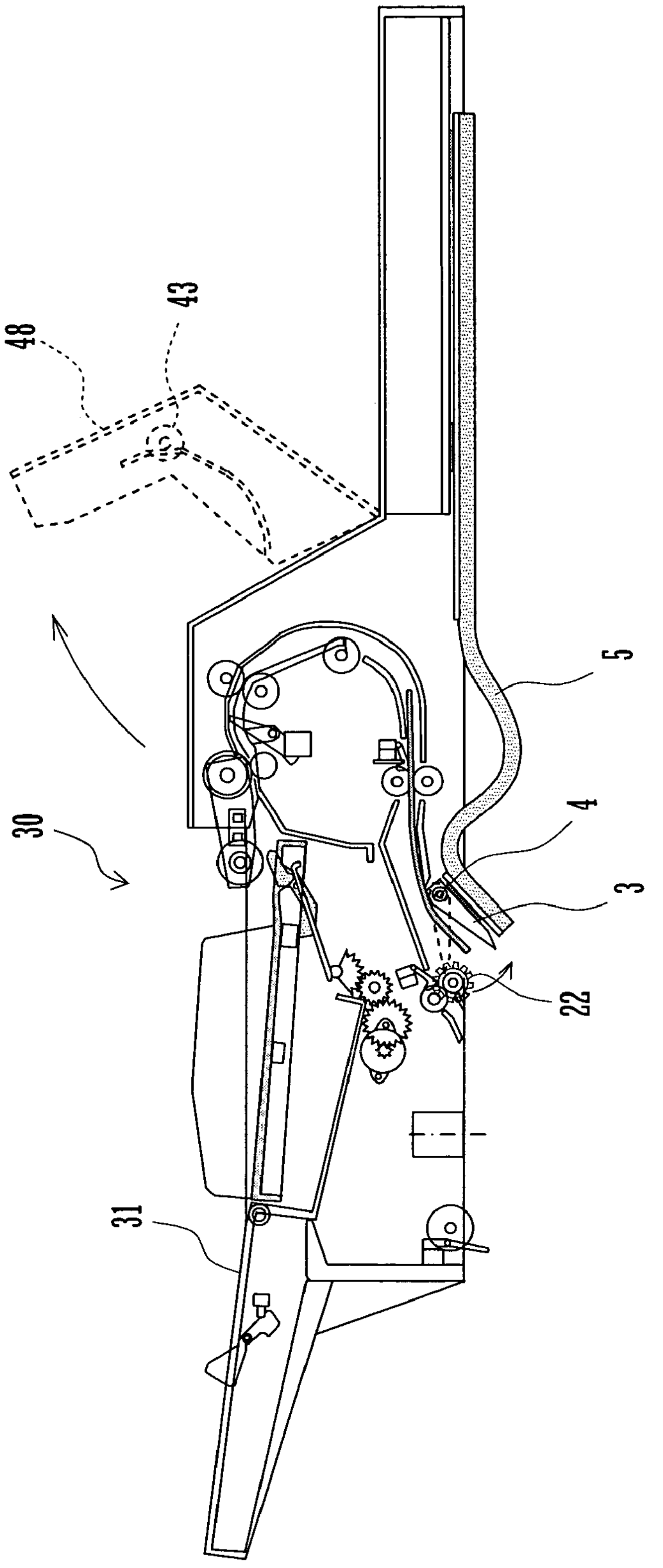
FIG. 8 is a diagram illustrating movement of an exposing mechanism according to a first embodiment of the invention.

FIG. 7 is a view illustrating a configuration of the proximity of the exposed area Z1 of the bottom surface of the device 30. In the first embodiment, the second surface 3B of the document guide 3 serves as part of the exposed area Z1. A tab 23 is provided at a longitudinal end of the document guide 3. In the exposed area Z1, a torsion coil spring 25 is provided for biasing the document guide 3 back to the covering position. In the proximity of the exposed area Z1, a knob 22 is also provided for manually rotating registration rollers 46. The knob 22 is connected to a rotating shaft of the registration rollers 46. When the tab 23 is pulled to pivot the document guide 3 to the exposing position, the unfixed portion A2 of the document holder 5 is caused to be bended, as shown in FIG. 8. Accordingly, part of the document holder 5 is allowed to be withdrawn from the exposed area Z1, with the fixed portion A3 fixed to the fixed area Z3.

Normally, a top cover 48 is opened to remove an original document jammed in the upper portion of the document transport path R. If an original document is jammed while being held by the registration rollers 46, the knob 22 is rotated to remove the jammed document from the path R.

In the event of an original document being jammed in the registration area 6, however, it is hard to remove the jammed document from the area 6 in either of the above-mentioned methods. In the present embodiment, therefore, the exposing mechanism as described earlier is used to expose part of the document transport path R in the exposed area Z1 so that a jammed original document is removed.

When the document holder 5 is withdrawn from the exposed area Z1 and the part of the path R is exposed through the area Z1, the path R is exposed to the outside of the device 30. Accordingly, this exposure of the path R allows a jammed original document to be removed through the exposed area Z1 even in the event that the document is jammed in the lower portion of the path R.

Figure 9:
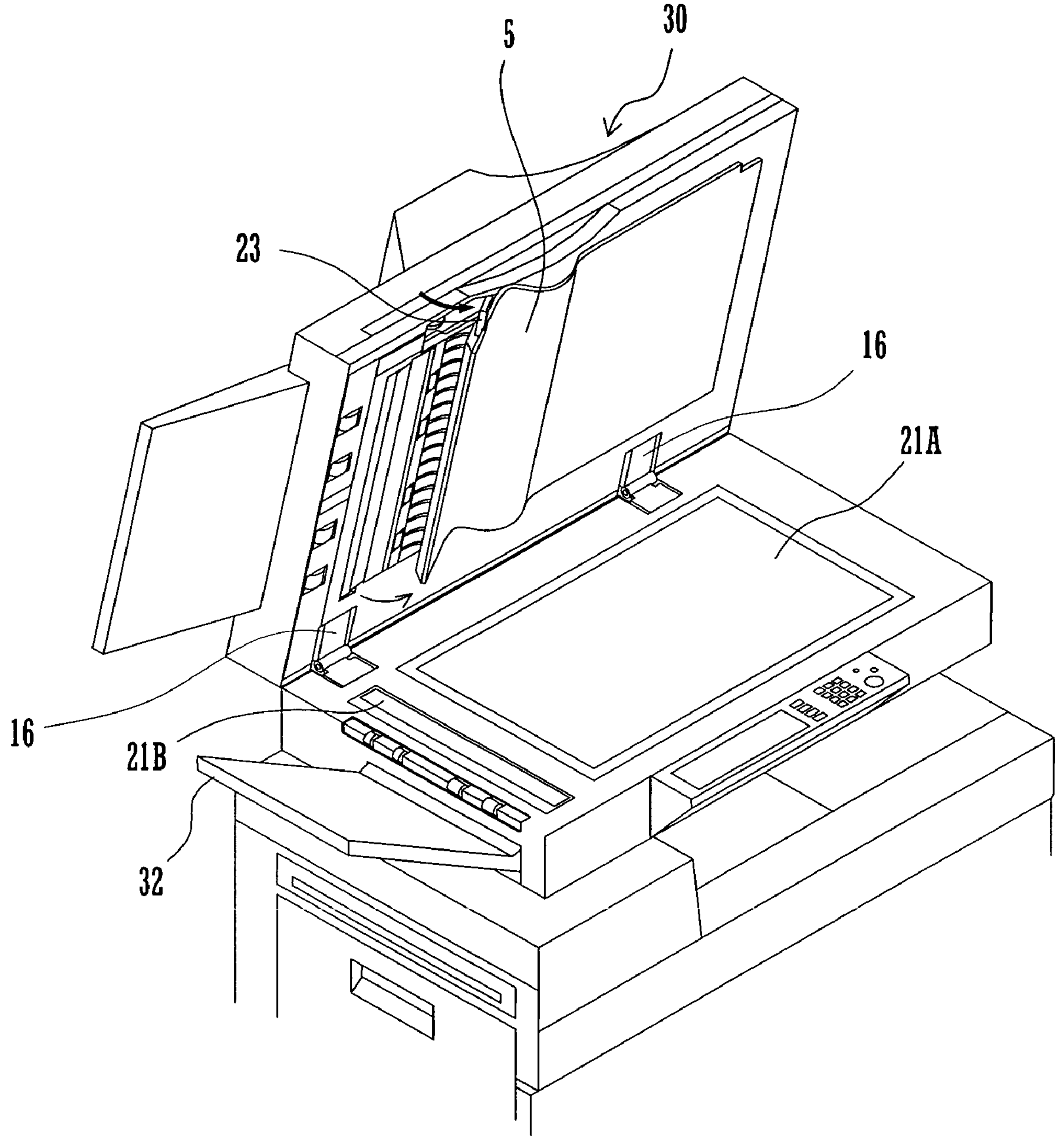
FIG. 9 is another diagram illustrating the movement of the exposing mechanism according to the first embodiment of the invention.

As shown in FIG. 9, the part of the path R is exposed through the exposed area Z1 by pulling the tab 23 and thereby pivoting the document guide 3. Further, the guide 3 is biased in such a direction as to return from the exposing position to the covering position, by the spring 25 as shown in FIG. 7. Accordingly, when the tab 23 is let go after a jammed document is removed, the guide 3 automatically returns to the covering position to cover the path R. When the device 30 is to be pivoted in a direction to cover the platens 21A and 21B, the guide 3 is already in the covering position and thus causes no damage to the platens 21A and 21B and thereto.

The spring 25 as a biasing member in the present embodiment is a torsion coil spring made of stainless steel spring wire, piano wire, or the like. Alternatively, the spring 25 may be a tension coil spring, or a leaf spring made of stainless steel or phosphor-bronze spring plate.

In the present embodiment, in addition, the document transport path R is adapted so as to be exposed to the left with respect to the front of the device 30. Alternatively, the path R may be adapted so as to be exposed to the right.

Figure 10:
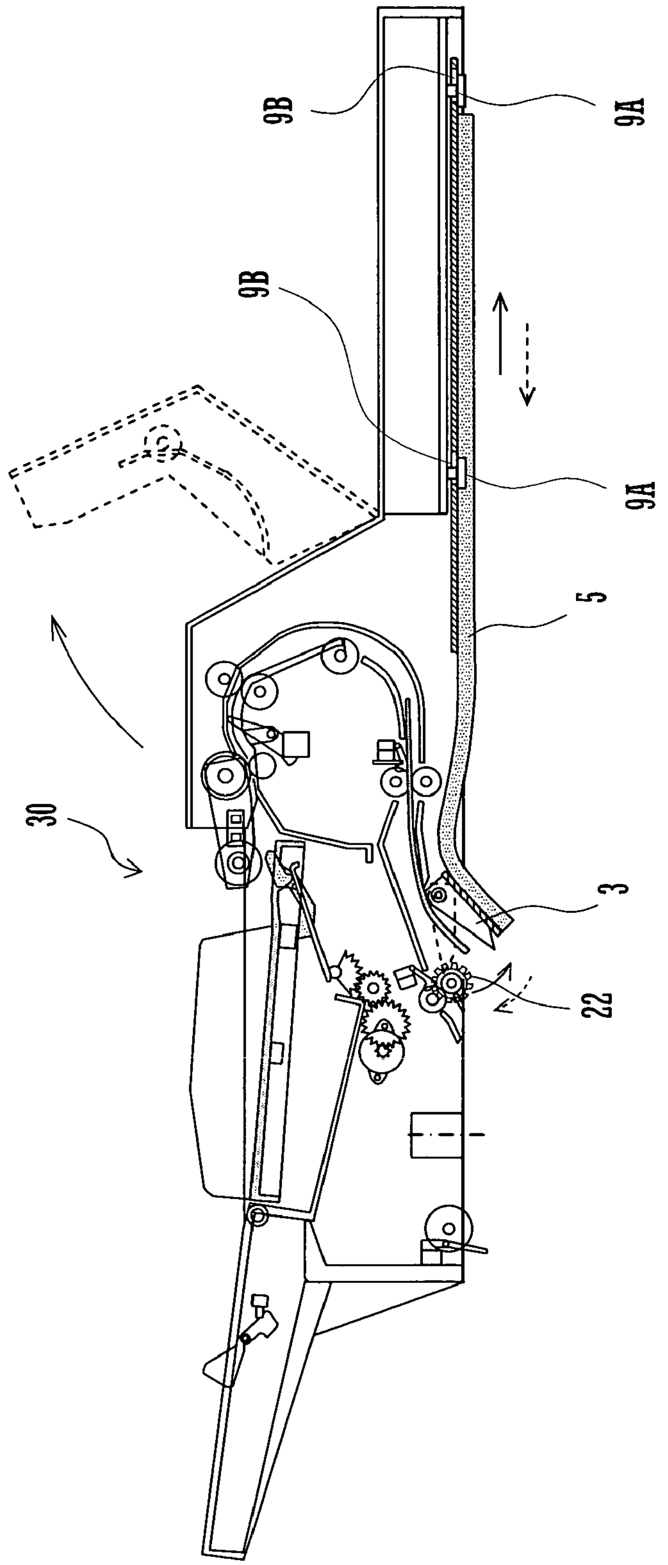
FIG. 10 is a diagram illustrating movement of an exposing mechanism according to a second embodiment of the invention.

FIG. 10 is a diagram illustrating a configuration of a document transporting device according to a second embodiment of the invention. The document transporting device 30 according to the second embodiment is similar in basic configuration to that according to the first embodiment. However, the device 30 according to the present embodiment is different in a manner in which the document holder 5 is withdrawn from the exposed area Z1.

In the second embodiment, as shown in FIG. 10, a plurality of hanging pins 9A are attached to respective predetermined portions of the bottom surface of the device 30. A plurality of slits 9B in which to put the pins 9A are formed in respective predetermined portions at both ends of the document holder 5. When the document holder 5 is mounted on the mounting portion Z of the bottom surface of the device 30, the pins 9A are put in the slits 9B, with heads of the pins 9A supporting the document holder 5 from below. Thus, the document holder 5 is rendered slidable within a range corresponding to longitudinal length of each of the slits 9B.

In the foregoing configuration, when the document guide 3 is pivoted to the exposing position with the tab 23, the document holder 5, except for the exposed portion A1, is slid along the bottom surface of the device 30 and withdrawn from the exposed area Z1. Thus, this configuration allows the document transport path R to be partly exposed through the exposed area Z1, thereby allowing an original document jammed in the path R to be removed. When the exposed portion A1 is pivoted together with the guide 3, such a force is generated as to bend and fold the document holder 5. In the present embodiment, however, the document holder 5 is slid to dissipate the force, thereby being prevented from being bended excessively. Accordingly, in the event of an original document being jammed, the document holder 5 is properly withdrawn, even if the holder 5 does not have a portion likely to be bended. As described above, the document holder 5 is slidably supported by the pins 9A and the slits 9B in the present embodiment. Alternatively, the holder 5 may be rendered slidable by rail grooves that are provided in the device 30 and sliding members that are mounted on the holder 5 so as to be fit into the grooves slidably along the grooves.

Figure 11:
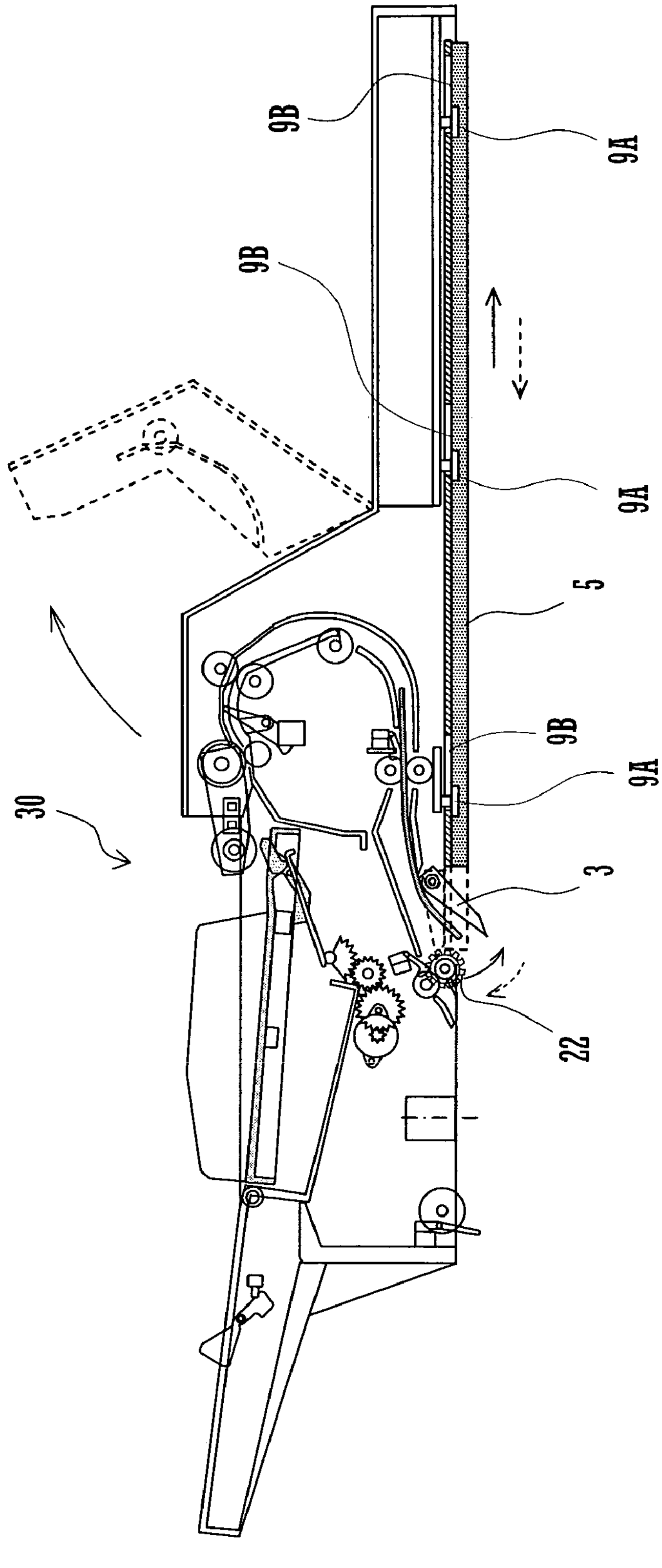
FIG. 11 is a diagram illustrating movement of an exposing mechanism according to a third embodiment of the invention.

FIG. 11 is a diagram illustrating a configuration of a document transporting device according to a third embodiment of the invention. The document transporting device 30 according to the third embodiment is similar in basic configuration to those according to the first and second embodiments. However, the device 30 according to the present embodiment is different in a manner in which the document holder 5 is withdrawn from the exposed area Z1.

In the present embodiment, unlike in the first and second embodiments, the second surface 3B of the document guide 3 is not fixed to the exposed portion A1 of the document holder 5. The entire document holder 5 is fastened to the device 30 with the pins 9A and the slits 9B. The foregoing configuration allows the entire holder 5 to be slid along the bottom surface of the device 30.

Also, the document guide 3 is supported so as to be pivotable around the pivot shaft 4 that is oriented perpendicular to the document transport path R. Accordingly, in the even that an original document is jammed, the guide 3 is pivoted to expose the path R and the holder 5 is slid parallel to the document transport direction, thereby allowing the path R to be exposed to the outside. In the configuration according to the present embodiment, the guide 3 is pivoted away from the path R and brought into contact with an end of the document holder 5. Thus, the pivot movement of the guide 3 automatically causes the holder 5 to be slid along the bottom surface of the device 30.

The configuration allows the path R to be partly exposed by withdrawing the holder 5 from the exposed area Z1 without bending the holder 5, as shown in FIG. 11. Accordingly, the holder 5 is prevented from getting a deep bending crease and from being deteriorated.

Figure 12:
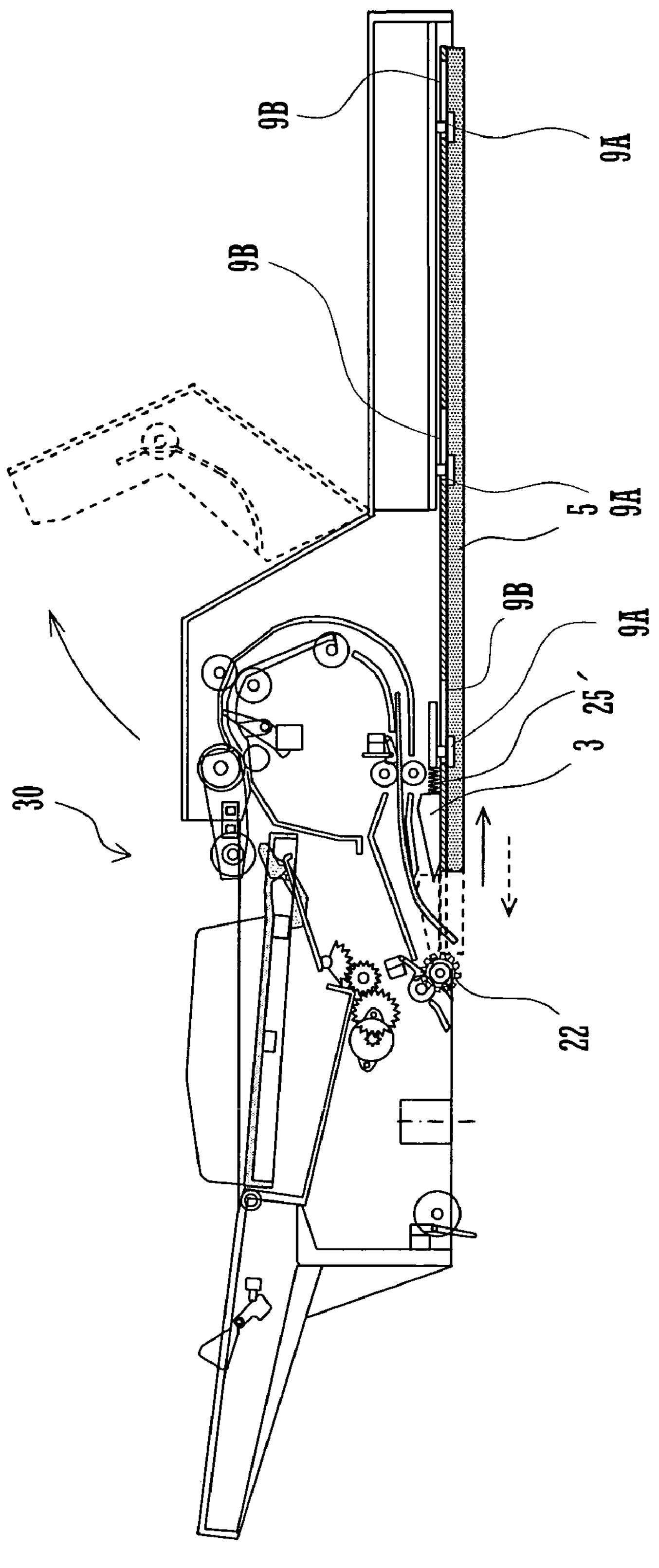
FIG. 12 is a diagram illustrating movement of an exposing mechanism according to a fourth embodiment of the invention.

FIG. 12 is a diagram illustrating a configuration of a document transporting device according to a fourth embodiment of the invention. In the fourth embodiment, as well as in the third embodiment, the holder 5 is withdrawn from the exposed area Z1 by sliding the entire holder 5 along the bottom surface of the device 30 in the document transport direction.

In the present embodiment, the document guide 3 is slid along the bottom surface of the device 30 to the exposing position, as shown in FIG. 12. Also, a tension coil spring 25' is provided as a biasing member for biasing the guide 3 back to the covering position.

In the present embodiment, the guide 3 is slid with the tab 23 in order to expose part of the path R through the exposed area Z1. Further, the spring 25' allows the guide 3 to return to the covering position automatically after a jammed original document is removed from the path R.

It is to be noted that the configuration of the document holder 5 of the invention includes, but is not limited to, those as described in the first to fourth embodiments. The document holder 5can include arbitrary materials or have arbitrary size, thickness, or the like.

The first to third embodiments of the invention allow the document transport path R to be exposed by pivoting the document guide 3 around the pivot shaft 4 that is oriented perpendicular to the document transport direction. Thus, the invention allows an original document jammed in the path R to be removed by a small movement of the document holder 5. It is to be particularly noted that the document guide 3 is pivoted in a direction perpendicular to a direction in which the document transporting device 30 as the platen cover is pivoted. This provides easy access to the inside of the path R, thereby facilitating removal of a jammed original document in the path R.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A document transporting device, comprising:

a platen cover adapted to expose and cover a platen, the platen cover including an automatic document transporting section that has a document transport path formed thereinside for transporting an original document to the platen;

a document holder mounted on a mounting portion of a surface of the platen cover, the surface facing the platen when the platen is covered with the platen cover;

an exposing mechanism including a movable plate, the movable plate being disposed between the document transport path and an exposed area that is located at a lateral end of the mounting portion, wherein the exposing mechanism is adapted to expose the document transport path through the exposed area by moving, away from the exposed area, the movable plate and a first portion of the document holder that is positioned on the exposed area, wherein the mounting portion has an unfixed area that a second portion of the document holder faces but is not fixed to, and a fixed area that a third portion of the document holder faces and is fixed to, the exposed area and the fixed area sandwiching the unfixed area therebetween, and wherein the document holder is supported in at least part of the exposed area by the movable plate and supported in at least part of the fixed area by the platen cover, and wherein the second portion of the document holder is thinner than the first and third portions of the document holder in such a manner that the second portion of the document holder is more likely to be bended smoothly than the first and third portions of the document holder are.

2. The document transporting device according to claim 1, wherein the movable plate has a first surface and a second surface, the first surface serving as part of the document transport path, the second surface being connected to the first portion of the document holder, and the movable plate being supported pivotably around a pivot shaft that is oriented in a direction perpendicular to a document transport direction.

3. The document transporting device according to claim 2, further comprising a biasing member for applying to the movable plate such a force as to move the movable plate from an exposing position to a covering position, the document transport path being exposed when the movable member is in the exposing position and covered when the movable member is in the covering position.

4. The document transporting device according to claim 1, wherein the exposing mechanism is adapted to withdraw the first portion of the document holder by pivoting the first portion in a direction away from the document transport path, and wherein the second portion is adapted to bend smoothly when the first portion of the document holder is moved away from the exposed area, while the first and third portions of the document holder remain flat.

5. The document transporting device according to claim 4, wherein the first and third portions of the document holder have a multi-layer construction consisting of a white sheet to have contact with an original document, a cushion mat made of a foam material, and a mylar sheet being flat and smooth, and wherein the second portion of the document holder has a multi-layer construction consisting of only a white sheet to have contact with an original document, a cushion mat made of a foam material.

6. The document transporting device according to claim 5, wherein the document holder is adapted to be detachable from the movable plate and from the platen cover.

7. A document reading device, comprising:

a document transporting device according to claim 1;

a document reading section adapted to read image data from an original document placed on the platen.

8. An image forming apparatus, comprising:

a document transporting device according to claim 1; and a document reading section adapted to read image data from an original document placed on the platen; and an image forming section adapted to form an image based on image data as read by the document reading section.

* * * * *